(12) United States Patent
Fischer et al.

(10) Patent No.: US 9,131,474 B2
(45) Date of Patent: Sep. 8, 2015

(54) DEDICATED SIGNATURE ALLOCATION AND CHOICE

(71) Applicant: LG ELECTRONICS INC., Seoul (KR)

(72) Inventors: Patrick Fischer, Bourg la Reine (FR); Remi Feuillette, Paris (FR); Dragan Vujcic, Limours (FR)

(73) Assignee: LG ELECTRONICS INC., Seoul (KR)

( * ) Notice: Subject to any disclaimer, the term of this patent is extended or adjusted under 35 U.S.C. 154(b) by 50 days.

(21) Appl. No.: 14/042,204

(22) Filed: Sep. 30, 2013

(65) Prior Publication Data

US 2014/0029548 A1   Jan. 30, 2014

Related U.S. Application Data

(63) Continuation of application No. 12/673,757, filed as application No. PCT/KR2008/004756 on Aug. 14, 2008, now Pat. No. 8,570,992.

(60) Provisional application No. 60/956,117, filed on Aug. 15, 2007.

(51) Int. Cl.
 *H04W 4/00* (2009.01)
 *H04W 74/02* (2009.01)
 *H04W 74/00* (2009.01)
 *H04W 74/08* (2009.01)

(52) U.S. Cl.
 CPC ............ *H04W 74/02* (2013.01); *H04W 74/004* (2013.01); *H04W 74/0866* (2013.01); *H04W 74/0833* (2013.01)

(58) Field of Classification Search
 CPC .................................................... H04W 84/12
 See application file for complete search history.

(56) References Cited

U.S. PATENT DOCUMENTS

| 7,103,027 B2 | 9/2006 | Dick et al. |
| 7,164,660 B2 | 1/2007 | Baker et al. |
| 8,064,546 B2 | 11/2011 | Jiang et al. |
| 2001/0027105 A1 | 10/2001 | Moulsley et al. |

(Continued)

FOREIGN PATENT DOCUMENTS

| CN | 1344474 | 4/2002 |
| EP | 1119118 | 7/2001 |

(Continued)

OTHER PUBLICATIONS

Panasonic, Zadoff-Chu sequence allocation on RACH for complexity reduction, 3GPP TSG-RAN WG1 Meeting #47bis, Sorrento, Italy; Jan. 15-19, 2007; Panasonic, NTT DoCoMo.*

(Continued)

*Primary Examiner* — Samina Choudhry
(74) *Attorney, Agent, or Firm* — Lee, Hong, Degerman, Kang & Waimey (57) ABSTRACT

Methods for allocating and choosing dedicated signatures for random access are provided. Options for allocating dedicated signatures include allocating the dedicated signature from the unused space of the random signature root index when there is unused space and allocating more dedicated signatures from the same root index using the same time/frequency resources if additional signatures are needed, and reserving some preambles from the contention-based random access preambles from both sets of preambles. The present invention also proposes that the dedicated signatures be reserved in each of two sets of preambles.

10 Claims, 8 Drawing Sheets

(56) References Cited

U.S. PATENT DOCUMENTS

| | | | |
|---|---|---|---|
| 2006/0153147 A1* | 7/2006 | Chillariga et al. | 370/337 |
| 2007/0230600 A1 | 10/2007 | Bertrand et al. | |
| 2008/0316961 A1 | 12/2008 | Bertrand et al. | |
| 2009/0046629 A1 | 2/2009 | Jiang et al. | |
| 2010/0284350 A1 | 11/2010 | Korhonen et al. | |
| 2011/0081912 A1 | 4/2011 | Fischer et al. | |
| 2011/0105121 A1* | 5/2011 | Kazmi et al. | 455/436 |
| 2012/0087329 A1 | 4/2012 | Imamura et al. | |

FOREIGN PATENT DOCUMENTS

| | | |
|---|---|---|
| KR | 10-0327104 | 2/2002 |
| KR | 10-0743578 | 7/2007 |
| WO | 0163775 | 8/2001 |
| WO | 2007108476 | 9/2007 |
| WO | 2008020609 | 2/2008 |
| WO | 2008053653 | 5/2008 |
| WO | 2008081531 | 7/2008 |
| WO | 2009022878 | 2/2009 |

OTHER PUBLICATIONS

United States Patent and Trademark Office U.S. Appl. No. 13/620,579, Office Action dated Mar. 20, 2014, 13 pages.
The State Intellectual Property Office of the People's Republic of China Application Serial No. 200880103636.1, Office Action dated Jan. 4, 2013, 4 pages.
Ericsson, "E-UTRA Scalability of Random Access Preamble", R1-061367, TSG-RAN WG1 #45, May 2006.
Ericsson, "E-UTRA Scalability of Random Access Preamble with cyclic prefix", R1-061870, TSG-RAN WG1 LTE Ad-Hoc, Jun. 2006.
United States Patent and Trademark Office U.S. Appl. No. 13/620,579, Final Office Action dated Oct. 17, 2014, 11 pages.
Philips, "Configuration of information field in RACH Access Preamble," 3GPP TSG-RAN WG2 Meeting #57, R2-070789, Feb. 2007, 3 pages.
Motorola, "Random Access Design and Procedure with Dedicated Signatures," 3GPP TSG RAN2 #57bis, R2-071230, Mar. 2007, 3 pages.
European Patent Office Application Serial No. 08793267.9 Search Report dated Nov. 13, 2014, 6 pages.

* cited by examiner

Option 1

FIG. 4B

Option 2

Signature for the contention based Random access

Unused space of the root index. Signature available for reservation

Signature for the contention based Random access for which reservation is allowed Signatures from set 1

Signatures from set 2

FIG. 5

DEDICATED SIGNATURE ALLOCATION AND CHOICE

CROSS-REFERENCE TO RELATED APPLICATIONS

This application is a continuation of U.S. patent application Ser. No. 12/673,757, filed on Dec. 20, 2010, now U.S. Pat. No. 8,570,992, which is the National Stage filing under 35 U.S.C. 371 of International Application PCT/KR2008/004756, filed on Aug. 14, 2008, which claims the benefit of U.S. Provisional Application No. 60/956,117, filed on Aug. 15, 2007, the contents of which are all hereby incorporated by reference herein in their entirety.

TECHNICAL FIELD

The present invention is directed to different methods for allocating and choosing dedicated signatures for random access.

BACKGROUND ART

Universal mobile telecommunications system (UMTS) is a 3rd Generation (3G) asynchronous mobile communication system operating in wideband code division multiple access (WCDMA) based on European systems, global system for mobile communications (GSM) and general packet radio services (GPRS). The long-term evolution (LTE) of UMTS is under discussion by the 3rd generation partnership project (3GPP) that standardized UMTS.

The 3GPP LTE is a technology for enabling high-speed packet communications. Many schemes have been proposed for the LTE objective including those that aim to reduce user and provider costs, improve service quality, and expand and improve coverage and system capacity. The 3GLTE requires reduced cost per bit, increased service availability, flexible use of a frequency band, a simple structure, an open interface, and adequate power consumption of a terminal as an upper-level requirement.

Figure 1:
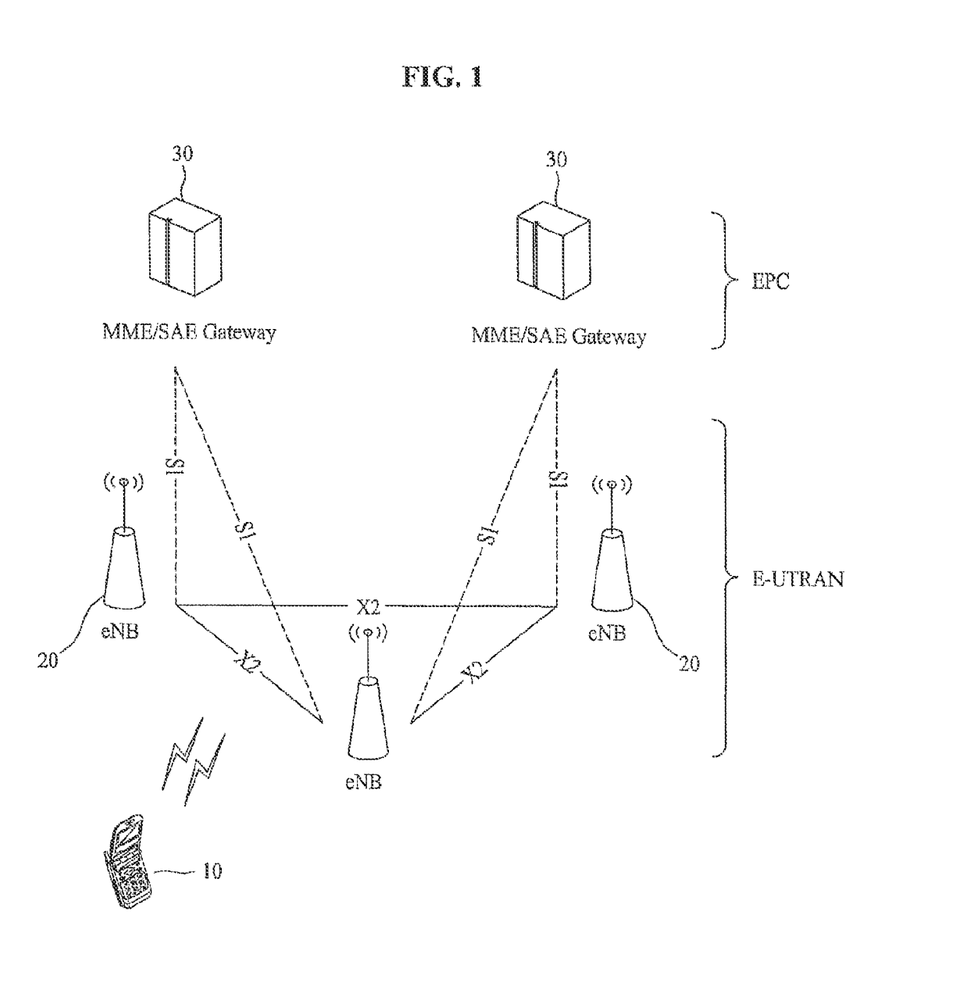
FIG. 1 illustrates the network structure of an E-UMTS.

FIG. 1 is a block diagram illustrating network structure of an evolved universal mobile telecommunication system (E-UMTS). The E-UMTS may be also referred to as an LTE system. The communication network is widely deployed to provide a variety of communication services such as voice and packet data.

As illustrated in FIG. 1, the E-UMTS network includes an evolved UMTS terrestrial radio access network (E-UTRAN) and an Evolved Packet Core (EPC) and one or more user equipment. The E-UTRAN may include one or more evolved NodeB (eNB) 20, and a plurality of user equipment (UE) 10 may be located in one cell. One or more E-UTRAN mobility management entity (MME)/system architecture evolution (SAE) gateways 30 may be positioned at the end of the network and connected to an external network.

As used herein, "downlink" refers to communication from an eNB 20 to a UE 10, and "uplink" refers to communication from the UE to an eNB. The UE 10 is communication equipment carried by a user and may also be referred to as a mobile station (MS), a user terminal (UT), a subscriber station (SS) or a wireless device.

An eNB 20 provides end points of a user plane and a control plane to the UE 10. The MME/SAE gateway 30 provides an end point of a session and mobility management function for a UE 10. The eNB 20 and MME/SAE gateway 30 may be connected via an S1 interface.

The eNB 20 is generally a fixed station that communicates with a UE 10 and may also be referred to as a base station (BS) or an access point. One eNB 20 may be deployed per cell. An interface for transmitting user traffic or control traffic may be used between eNBs 20.

The MME provides various functions including distributing paging messages to the eNBs 20, security control, idle state mobility control, SAE bearer control, and ciphering and integrity protection of non-access stratum (NAS) signaling. The SAE gateway host provides assorted functions including termination of U-plane packets for paging reasons and switching the U-plane to support UE 10 mobility.

The MME/SAE gateway 30 will be referred to herein simply as a "gateway" for clarity. However, it is understood that the MME/SAE gateway 30 includes both an MME and an SAE gateway.

A plurality of nodes may be connected between the eNB 20 and the gateway 30 via the S1 interface. The eNBs 20 may be connected to each other via an X2 interface and neighboring eNBs may have a meshed network structure that has the X2 interface.

Figure 2A:
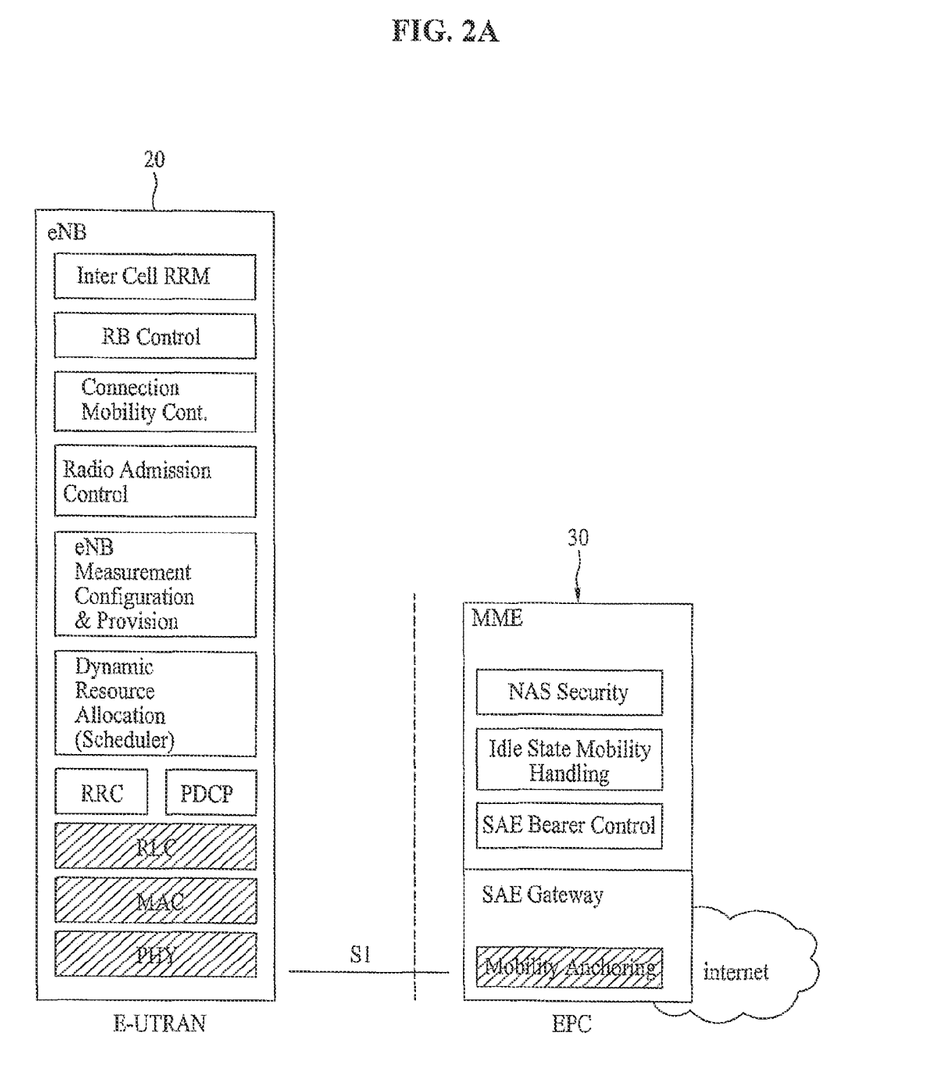
FIG. 2(a) illustrates the architecture of an E-UTRAN and gateway.

FIG. 2(a) is a block diagram depicting architecture of a typical E-UTRAN and a typical gateway 30. As illustrated in FIG. 2(a), the eNB 20 may perform functions such as selection for gateway 30, routing toward the gateway during a Radio Resource Control (RRC) activation, scheduling and transmitting paging messages, scheduling and transmitting Broadcast Channel (BCCH) information, dynamic allocation of resources to UEs 10 in both uplink and downlink, configuration and provisioning eNB measurements, radio bearer control, radio admission control (RAC), and connection mobility control in LTE_ACTIVE state. In the EPC, the gateway 30 may perform functions such as paging origination, LTE-IDLE state management, ciphering the user plane, System Architecture Evolution (SAE) bearer control, and ciphering and integrity protection of Non-Access Stratum (NAS) signaling.

Figure 2B:
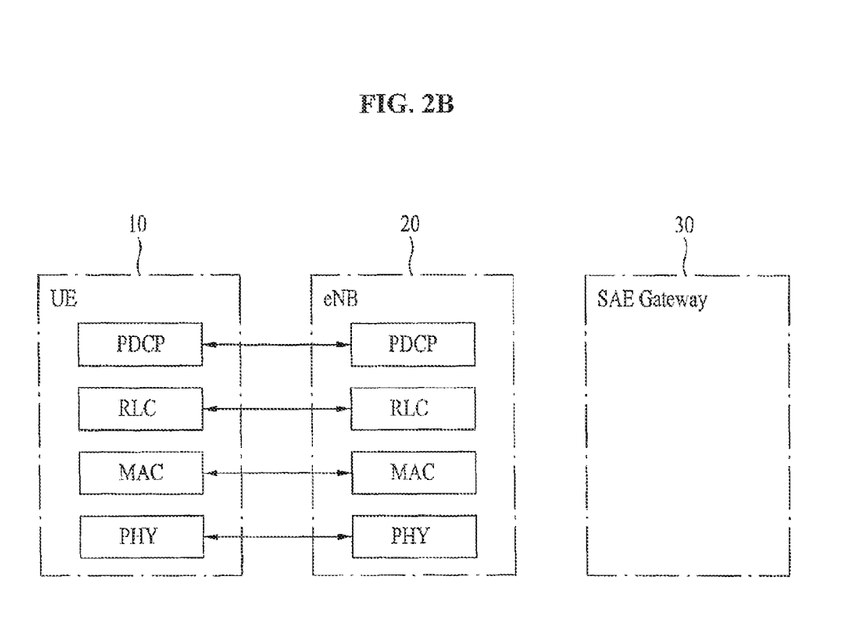
FIGS. 2(b) and 2(c) illustrate the user-plane protocol and control-plane protocol for the E-UMTS.
Figure 2C:
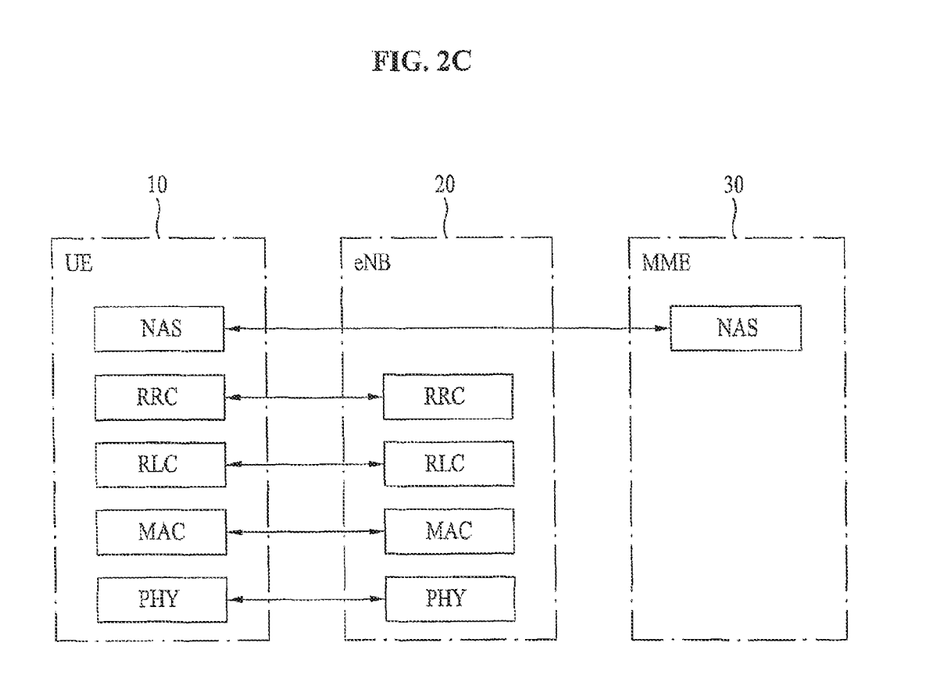

FIGS. 2(b) and 2(c) are block diagrams depicting the user-plane protocol and the control-plane protocol stack for the E-UMTS. As illustrated in FIGS. 2(b) and 2(c), the protocol layers may be divided into a first layer (L1), a second layer (L2) and a third layer (L3) based upon the three lower layers of an open system interconnection (OSI) standard model that is well-known in the art of communication systems.

The physical layer, or first layer (L1), provides an information transmission service to an upper layer by using a physical channel. The physical layer is connected to a medium access control (MAC) layer located at a higher level through a transport channel, with data transferred between the MAC layer and the physical layer via the transport channel. Data is transferred via a physical channel between different physical layers, such as between the physical layer of a transmission side and the physical layer of a reception side.

The MAC layer of Layer 2 (L2) provides services to a radio link control (RLC) layer, which is a higher layer, via a logical channel. The RLC layer of Layer 2 (L2) supports the transmission of data with reliability. It should be noted that although the RLC layer is illustrated in FIGS. 2(b) and 2(c), the RLC layer is not required if the MAC layer performs the RLC functions.

The PDCP layer of Layer 2 (L2) performs a header compression function that reduces unnecessary control information. This allows efficient transmission of data utilizing Internet protocol (IP) packets, such as IPv4 or IPv6, over a radio or wireless interface that has a relatively small bandwidth.

A radio resource control (RRC) layer located at the lowest portion of the third layer (L3) is only defined in the control plane and controls logical channels, transport channels and the physical channels in relation to the configuration, reconfiguration, and release of the radio bearers (RBs). A RB signifies a service provided by the second layer (L2) for data transmission between a UE 10 and the E-UTRAN.

As illustrated in FIG. 2(b), the RLC and MAC layers are terminated in an eNB 20 on the network side and may perform functions such as scheduling, Automatic Repeat Request (ARQ), and hybrid automatic repeat request (HARQ). The PDCP layer is terminated in an eNB 20 on the network side and may perform the user plane functions such as header compression, integrity protection, and ciphering.

As illustrated in FIG. 2(c), the RLC and MAC layers are terminated in an eNB 20 on the network side and perform the same functions as for the control plane. As illustrated in FIG. 2(c), the RRC layer is terminated in an eNB 20 on the network side and may perform functions such as broadcasting, paging, RRC connection management, Radio Bearer (RB) control, mobility functions, and UE 10 measurement reporting and controlling. As illustrated in FIG. 2(c), the NAS control protocol is terminated in the MME of gateway 30 on the network side and may perform functions such as a SAE bearer management, authentication, LTE_IDLE mobility handling, paging origination in LTE_IDLE, and security control for signaling between the gateway and UE 10.

The NAS control protocol may use three different states. An LTE_DETACHED state is used if there is no RRC entity. An LTE_IDLE state is used if there is no RRC connection while storing minimal UE 10 information. An LTE_ACTIVE state is used if the RRC connection is established. Furthermore, the RRC state may be divided into two different states, such as RRC_IDLE and RRC_CONNECTED.

In RRC_IDLE state, the UE 10 may receive broadcasts of system information and paging information while the UE specifies a Discontinuous Reception (DRX) configured by the NAS and the UE has been allocated an identification (ID) which uniquely identifies the UE in a tracking area. Furthermore, no RRC context is stored in the eNB in RRC-IDLE state.

In RRC_CONNECTED state, the UE 10 has an E-UTRAN RRC connection and a context in the E-UTRAN, such that transmitting and/or receiving data to and from the eNB is possible. Furthermore, the UE 10 can report channel quality information and feedback information to the eNB.

In RRC_CONNECTED state, the E-UTRAN knows the cell to which the UE 10 belongs. Therefore, the network can transmit and/or receive data to and from the UE 10, control mobility, such as handover, of the UE, and perform cell measurements for a neighboring cell.

In RRC_IDLE mode, the UE 10 specifies the paging DRX Discontinuous Reception cycle. Specifically, the UE 10 monitors a paging signal at a specific paging occasion of every UE specific paging DRX cycle.

Figure 3:
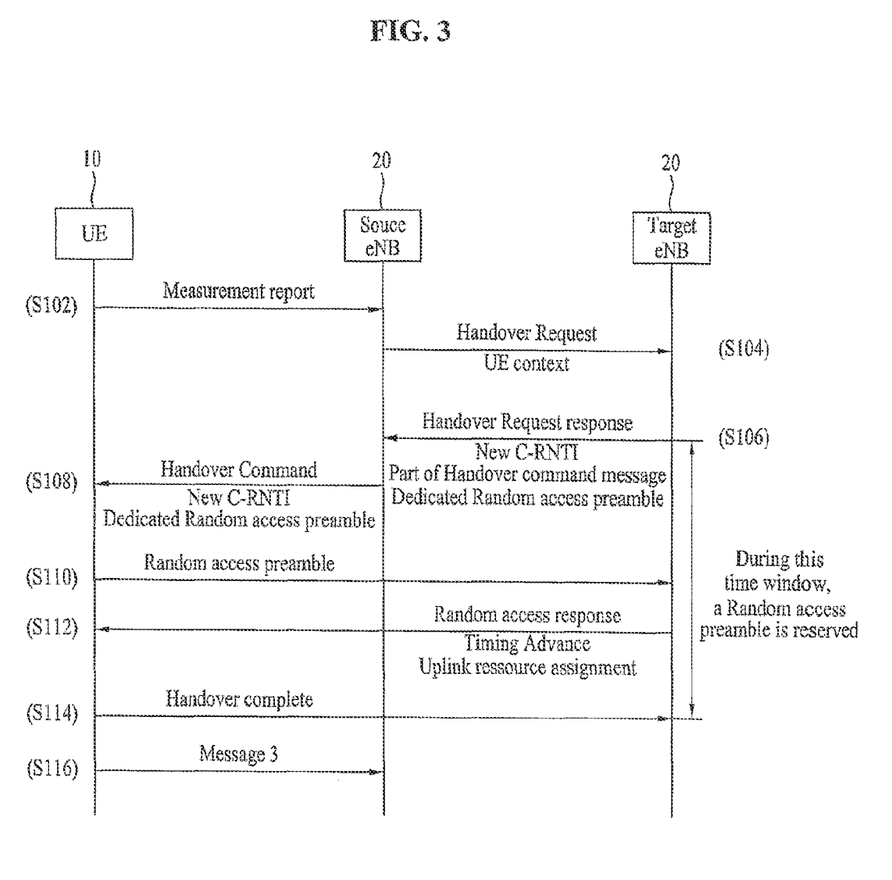
FIG. 3 illustrates the conventional handover procedure for LTE.

FIG. 3 illustrates the conventional LTE handover procedure. The UE 10 sends a measurement report to the source eNB 20 (S102). The source eNB 20 sends a handover request message with the UE 10 context to the target eNB (S104).

The target eNB 20 sends a handover request response to the source eNB (S106). The handover request response includes the new CRNTI, a portion of a handover command message and information related to random access, such as a. dedicated access signature for the UE 10 to make a contention-free random access on the target cell. A signature is reserved at this time.

The source eNB 20 sends the handover command to the UE (S108). The handover command includes the new C-RNTI and information related to random access, such as the dedicated signature for the UE 10 to use.

A random access procedure is performed in the target cell after the handover command in order for the UE 10 to obtain the timing advance (TA) value. This random access procedure should be contention-free such that a signature is reserved to the UE 10 in order to avoid collision.

The UE 10 starts the random access procedure on the target eNB 20 by sending the random access preamble using a dedicated signature (S110). The target eNB 20 sends the random access response message to the UE 10 (S112). The random access response message includes the TA and uplink resource assignment. The UE 10 sends the handover complete message to the target eNB 20 (S114)

The LTE random access procedure may be either contention-based or contention-free. The random access preamble is contention-based when the UE 10 randomly chooses the preamble from among the available set of signatures. The random access preamble is contention-free when the UE 10 is assigned the signature for use by the eNB 20 via dedicated signaling.

DISCLOSURE

Technical Problem

The dedicated signature assignment can occur for handover and upon the arrival of downlink data if the UE 10 is not time-aligned. The random access preambles for both contention-based and contention-free random access should be based on Zadoff-Chu sequence with Zero Correlation Zone (ZC-ZCZ). The current LTE random access procedure uses two sets of signatures.

Technical Solution

In one aspect of the present invention, a method of requesting a random access connection between a wireless mobile terminal and a base station is provided. The method includes receiving information including at least one signature root sequence index, a cyclic shift parameter and a dedicated signature parameter, the dedicated signature parameter associated with at least one contention-free signature, recognizing contention-based signatures and contention-free signatures based on the dedicated signature parameter, the contention-based signatures recognized as generated based on the at least one signature root sequence index and the cyclic shift parameter and the contention-free signatures recognized as remaining signatures unused by the contention-based signatures and receiving a dedicated signature identifier representing one of the contention-free signatures, wherein at least one of the contention-based signatures is associated with a first signature set corresponding to a first transport format and at least one of the contention-free signatures is associated with a second signature set corresponding to a second transport format and wherein at least one of the contention-free signatures associated with the dedicated signature parameter is in the second signature set.

It is contemplated that the method includes contiguously arranging indices associated with the contention-free signatures. It is further contemplated that the method includes dividing the contiguously arranged indices between the first and second signature sets.

It is contemplated that a number contention-based signatures in the first signature set is NRset=ceil((Nset)/*(Nr−Nunused)) and a number contention-based signatures in the second signature set is Nrset=Nr−NRset−Nunused, wherein Nr is a total number of signatures that can be reserved among contention-based random access signatures, Nset is a number of signatures in the first signature set, Nset is a number of signatures in the second signature set, and Nunused is a number of signatures that are not used root sequences. It is further contemplated that the dedicated signature parameter comprises either a total number of contention-free signatures that must be reserved or an additional number of signatures that must be reserved from the contention-based signatures.

It is contemplated that the signatures are associated with Zadoff-Chu signatures. It is further contemplated that the contention-free signatures associated with the dedicated signature parameter that are not in the second signature set are in the first signature set.

It is further contemplated that the method includes receiving at least two dedicated signature identifiers and selecting one of the at least two dedicated signature identifiers according to an amount of data for transmission, wherein at least one of the at least two dedicated signature identifiers is associated with the first signature set and the other of the at least two dedicated signature identifiers is associated with the second signature set. It is further contemplated that the at least two dedicated signature identifiers are received from a target base station during a handover procedure. Preferably, the at least one signature root sequence index, the cyclic shift parameter and the dedicated signature parameter are received via a broadcast channel.

In another aspect of the present invention, a mobile terminal for requesting a random access connection with a base station is provided. The mobile terminal includes a transmitting unit for transmitting information, a receiving unit for receiving information, a display unit for displaying information, an input unit for receiving inputs from a user and a processing unit processing received information including at least one signature root sequence index, a cyclic shift parameter and a dedicated signature parameter, the dedicated signature parameter associated with at least one contention-free signature, recognizing contention-based signatures and contention-free signatures based on the dedicated signature parameter, the contention-based signatures recognized as generated based on the at least one signature root sequence index and the cyclic shift parameter and the contention-free signatures recognized as remaining signatures unused by the contention-based signatures, and receiving a dedicated signature identifier representing one of the contention-free signatures, wherein at least one of the contention-based signatures is associated with a first signature set corresponding to a first transport format and at least one of the contention-free signatures is associated with a second signature set corresponding to a second transport format and wherein at least one of the contention-free signatures associated with the dedicated signature parameter is in the second signature set.

It is contemplated that the processing unit contiguously arranges indices associated with the contention-free signatures. It is further contemplated that the processing unit divides the contiguously arranged indices between the first and second signature sets.

It is contemplated that a number contention-based signatures in the first signature set is NRset=ceil((Nset)/*(Nr−Nunused)) and a number contention-based signatures in the second signature set is Nrset=Nr−NRset−Nunused, wherein Nr is a total number of signatures that can be reserved among contention-based random access signatures, Nset is a number of signatures in the first signature set, Nset is a number of signatures in the second signature set, and Nunused is a number of signatures that are not used root sequences. It is further contemplated that the dedicated signature parameter comprises either a total number of contention-free signatures that must be reserved or an additional number of signatures that must be reserved from the contention-based signatures.

It is contemplated that the signatures are associated with Zadoff-Chu signatures. it is further contemplated that the contention-free signatures associated with the dedicated signature parameter that are not in the second signature set are in the first signature set.

It is contemplated that the processing unit processes at least two received dedicated signature identifiers and selects one of the at least two dedicated signature identifiers according to an amount of data for transmission, wherein at least one of the at least two dedicated signature identifiers is associated with the first signature set and the other of the at least two dedicated signature identifiers is associated with the second signature set. It is further contemplated that the at least two dedicated signature identifiers are received from a target base station during a handover procedure. Preferably, the at least one signature root sequence index, the cyclic shift parameter and the dedicated signature parameter are received via a broadcast channel.

Additional features and advantages of the invention will be set forth in the description which follows, and in part will be apparent from the description, or may be learned by practice of the invention. It is to be understood that both the foregoing general description and the following detailed description of the present invention are exemplary and explanatory and are intended to provide further explanation of the invention as claimed.

These and other embodiments will also become readily apparent to those skilled in the art from the following detailed description of the embodiments having reference to the attached figures, the invention not being limited to any particular embodiments disclosed.

Advantageous Effects

An advantage of the first scheme is that a large number of preambles may be generated that are completely independent from the preambles used for contention-based random access. Advantages of the second scheme are that no additional ZC indexes are necessary and there is no need to use a new root sequence. An advantage of the third scheme is that no additional ZC indexes are required. An inconvenience of the fourth scheme is a decreased number of available preambles for non-contention based RACH, thereby increasing the collision probability.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention. Features, elements, and aspects of the invention that are referenced by the same numerals in different figures represent the same, equivalent, or similar features, elements, or aspects in accordance with one or more embodiments.

BEST MODE

Reference will now be made in detail to the preferred embodiments of the present invention, examples of which are illustrated in the accompanying drawings. The present invention presents several schemes for allocating dedicated signatures.

In a first scheme, signatures are allocated from separate root sequences. In this scheme, the signatures used for non-contention based random access are generated using different ZC root sequences than those used to generate contention-based random access preambles.

An advantage of the first scheme is that a large number of preambles may be generated that are completely independent from the preambles used for contention-based random access. Disadvantages of the first scheme are that the use of a new root sequence in a cell results in more interferences, more root sequences used per cell and cross-correlation and detection are more complex.

In a second scheme, signatures are allocated from the unused space of the random signature root index. In this scheme, different code resources are used for dedicated and random signatures.

The last sequence index used for contention-based signature opportunity is not necessarily fully allocated to generate the 64 signatures since the cyclic shift value is related to the cell size in that the shift must be larger than the maximum propagation delay for a given cell size. This allows the allocation of the remaining unused signatures to the contention-free access procedure.

Advantages of the second scheme are that no additional ZC indexes are necessary and there is no need to use a new root sequence. A disadvantage of the second scheme is that the number of remaining signatures opportunity is not fixed and may also be zero depending on the cell size or, in other words, on the length of the cyclic shift.

In a third scheme, signatures are allocated from the same root index using different time/frequency resources. The same code resources are used for dedicated and random signatures. In this scheme, contention-based and contention-free RACH signature opportunities are allocated from the same cyclic shifted versions over the same ZC sequences index.

An advantage of the third scheme is that no additional ZC indexes are required or, in other words, there is no need to use a new root sequence. A disadvantage of the third scheme is that the distinction between contention-free and contention-based preambles is made by the time/frequency resources used for RACH since there is no code distinction between contention-free and contention-based preambles, thereby requiring additional signaling.

In a fourth scheme, signatures are allocated from the same root index using the same time/frequency resources. This scheme consists of allowing the reservation of some preambles from the set of preambles used for the contention-based random access procedure in a semi-static way. For example, 16 preambles could be reserved. An inconvenience of the fourth scheme is a decreased number of available preambles for non-contention based RACH, thereby increasing the collision probability.

A preferred scheme is a hybrid between the second and fourth schemes. This hybrid scheme considers the advantages and disadvantages of the four schemes in order to minimize interferences introduced by the use of new root sequences and signaling.

The hybrid scheme allocates the dedicated signatures from the unused space of the random signature root index when there is unused space. The fourth scheme is utilized if more dedicated signatures are needed and some preambles are reserved from the contention-based random access preambles. The number of signatures that may be reserved among the contention-based signature sets is predetermined.

Figure 4A:
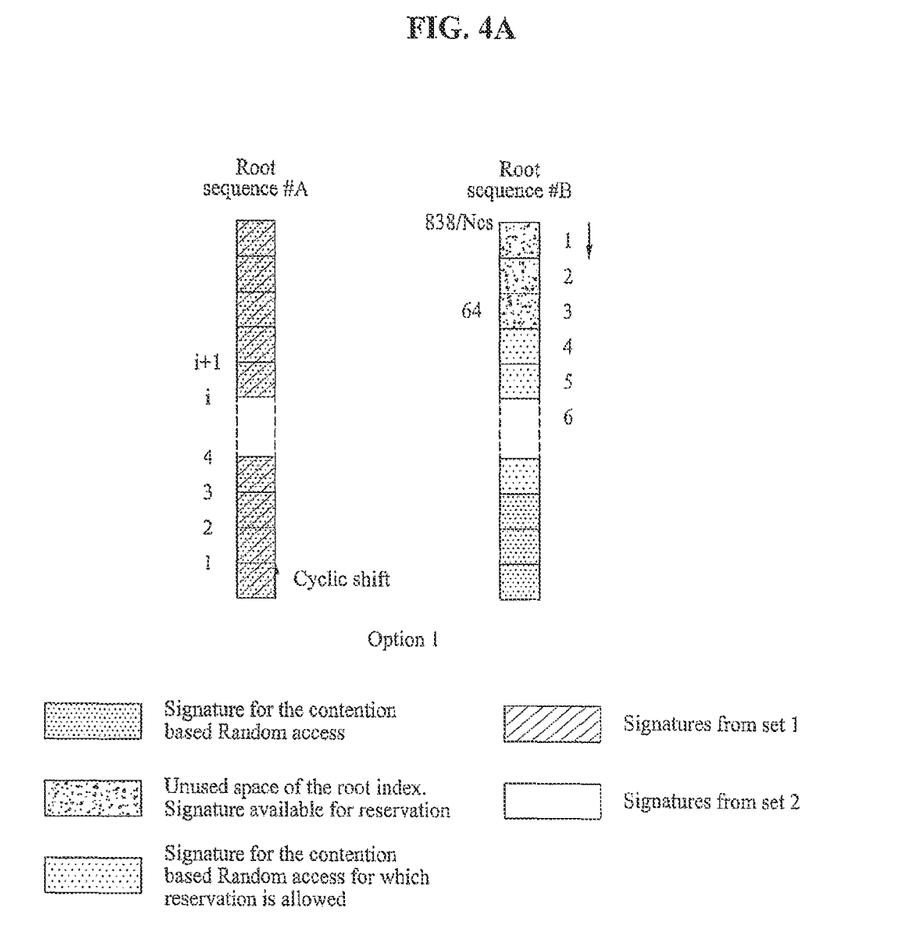
FIGS. 4(a) and 4(b) illustrate a method of dedicated signature allocation according to one embodiment of the present invention.
Figure 4B:
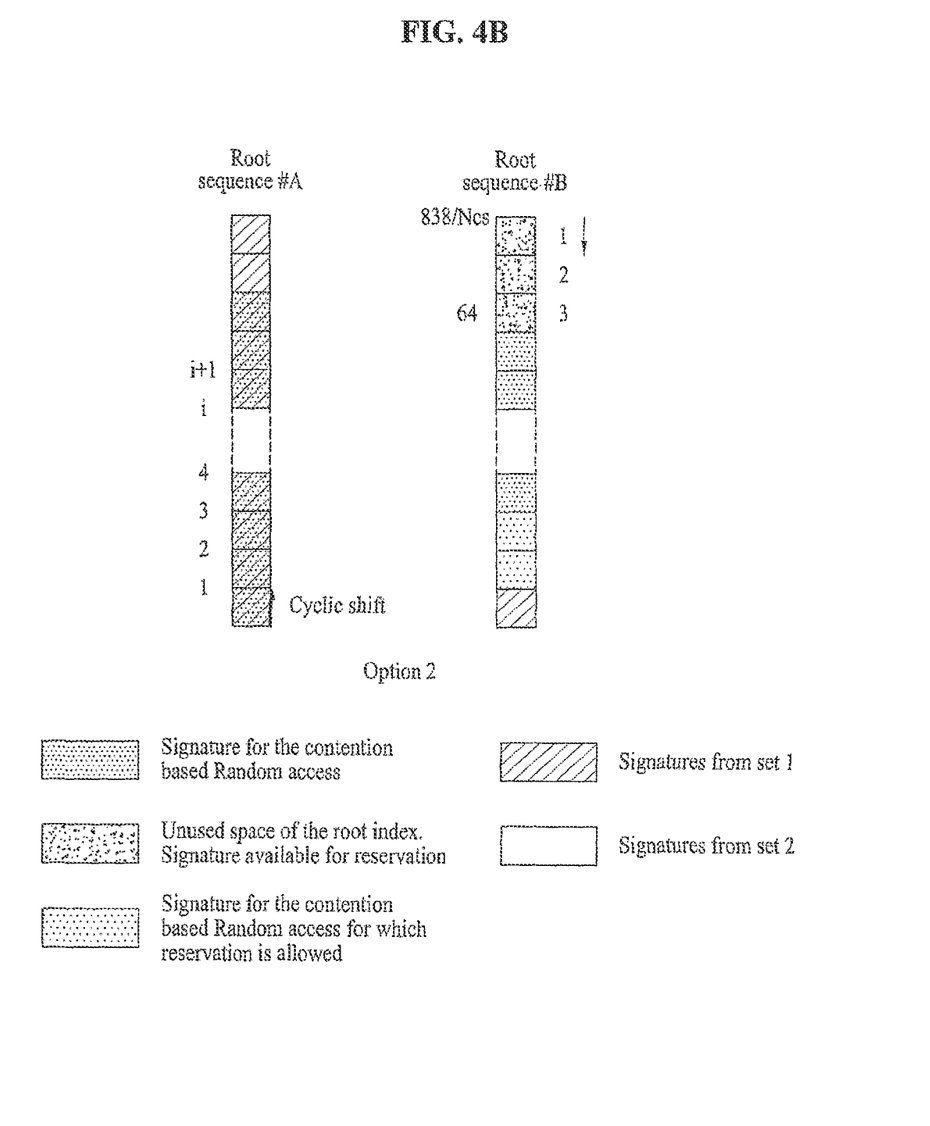

FIG. 4 illustrates dedicated signature allocation according to the present invention. In FIG. 4, it is assumed that the UE 10 knows the root sequences and cyclic shift value used in the cell where it will use the dedicated signature and that the hybrid method is used for the allocation of dedicated signatures.

One way to indicate to the UE 10 which signature has been reserved for its use is to simply indicate a number out of the total number of available signatures such that the UE knows how many cyclic shifts it will have to apply in order to generate the signature. The total number of available signatures is the number of signatures that can be generated from all the root sequences used in a given cell. The UE 10 will implicitly know that it must apply the cyclic shifts to root sequence #B if the number of cyclic shifts is higher than the max number of cyclic shifts applicable on root sequence #A.

However, this method requires that the eNB 20 send at least 6 bits of information to the UE 10. There are several options for optimizing the method. For all the options, the number of signatures that are reserved must be indicated to the UEs 10 that perform contention-based access, such as by being broadcast on the BCCH.

A first option for allocating dedicated signatures is to reduce the number of information bits to less than 6 bits is by defining in the standard that the signature for the contention-based random access for which reservation is allowed are the last signatures generated from the root sequence and to start numbering from the end, as illustrated by the arrow in FIG. 4(a).

The first option is dependent on the number of signatures that can be reserved, such as only 4 bits being necessary if the number of signatures that can be reserved is fixed at 16. For example, the eNB 20 may reserve signature 64 and send the information "3" to the UE 10. As illustrated in FIG. 4(a), 3 unused signatures are available. The first option requires that the space on the ZC index for reserved signatures be contiguous and located at the end of the index before the unused space.

One disadvantage of the first option is that all the signatures that can be reserved are from the same set and, therefore, the UE cannot choose a set, such as to indicate the required resources/channel quality. The first option also reduces the number of signatures available for contention-based only in one set and increases the collision probability for only one category of users.

A second option for allocating dedicated signatures addresses the disadvantages of the first option. The second option allocates the dedicated signatures between the two sets of signatures proportionally to the size of the set instead of allocating the reserved signatures at the end of the index from among the 64 signatures used for the contention-based random access.

For example, if Nr signatures can be reserved among the 64 contention-based random access signatures, those signatures are reserved between the two sets such that one part will be at the end of the first set and the other part at the beginning of the second set. The number of signatures reserved in each of the two sets can be calculated according to the following equation:

$$NRset1 = ceil\,(Nset1/64*(Nr-Nunused))\text{ and}$$
$$NRset2 = Nr-NRset1-Nunused$$

Where:
Nset1 the number of signatures in set 1
Nset2 the number of signatures in set 2
Nunused is the number of signatures that are not used in the root sequences
NRset1 the number of reserved signatures in set 1
NRset2 the number of reserved signatures in set 2
Ceil indicates integer (upper integer)

There are two alternatives to indicate to the UE 10 which signature to use for the second option. The first alternative is the less optimized alternative and indicates the signature with a number from 6 to 8 bits, with the upper bound predetermined depending on the number of signatures available in the unused space of the ZC index.

The second alternative, which is illustrated in FIG. 4(*b*), consists of sending offset information to indicate the signature to use, with the number of bits of the offset information dependent on the number of signatures that can be reserved. For example, 4 bits would be required if 16 signatures are dedicated without any unused space. The counting would be done from the first reservable signature of set 1 in FIG. 4(*b*) toward the last reservable signature of set 2 or from the end of the index toward the beginning of the sequence if the signature comes from the unused space of an index.

The UE 10 must choose between signatures in two groups in the second option for allocating dedicated signatures, as illustrated In FIG. 4(*b*). In order to optimize the resource allocation for the transmission of data in message 3 illustrated in FIG. 3, the UE 10 can be assigned a signature according to the required resources, such that the eNB 20 indicates to the UE the transport format to be used in message 3 together with the dedicated signature.

An advantage of this option for choosing a dedicated signature is that the eNB 20 designates only one signature. A disadvantage of this option is that the size of message 3 illustrated in FIG. 3 must accommodate the assigned signature.

An alternative option for choosing the dedicated signature is that the eNB 20 reserves two signatures each time, one from each signature set, such that the UE 10 chooses the signature according to the amount of data it must transmit. The eNB 20 should indicate for which transport formats of message 3 illustrated in FIG. 3 and/or radio conditions the UE 10 could use each reserved dedicated signature. The disadvantage of this option is that two signatures must be reserved.

Figure 5:
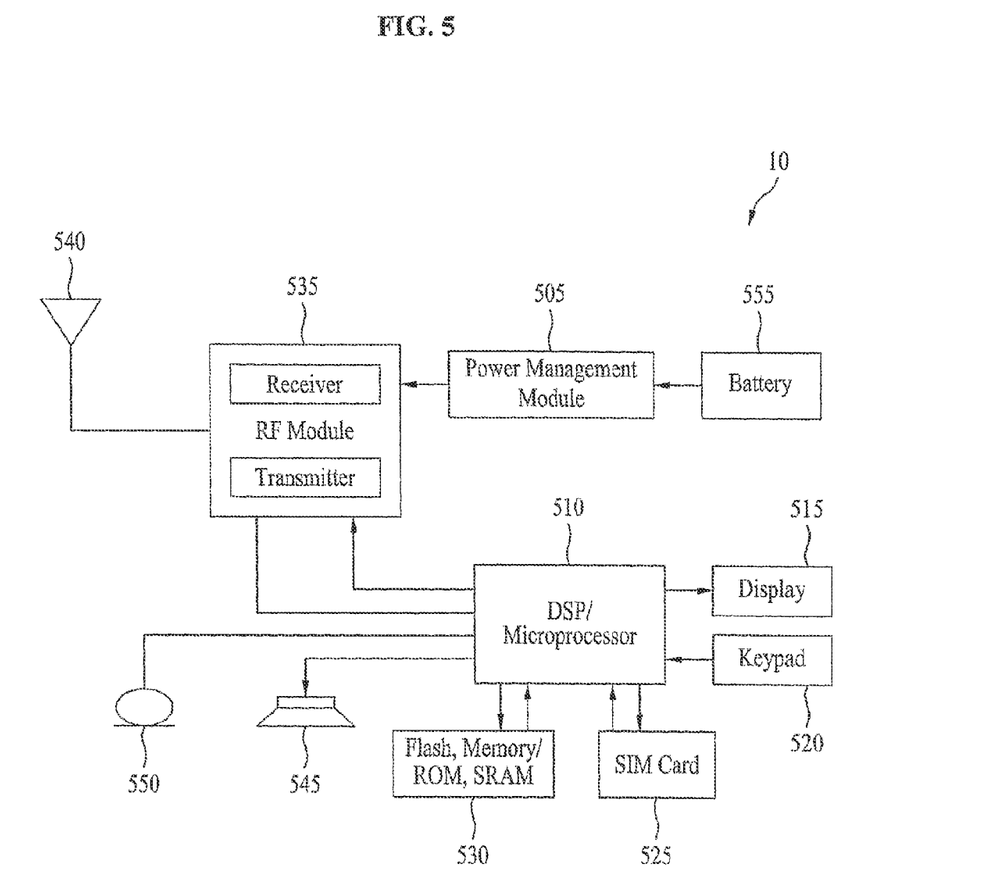
FIG. 5 illustrates a block diagram of a mobile station according to the present invention.

FIG. 5 illustrates a block diagram of a mobile station (MS) or UE 10. The UE 10 includes a processor (or digital signal processor) 510, RF module 535, power management module 505, antenna 540, battery 555, display 515, keypad 520, memory 530, SIM card 525 (which may be optional), speaker 545 and microphone 550.

A user enters instructional information, such as a telephone number, for example, by pushing the buttons of a keypad 520 or by voice activation using the microphone 550. The microprocessor 510 receives and processes the instructional information to perform the appropriate function, such as to dial the telephone number. Operational data may be retrieved from the Subscriber Identity Module (SIM) card 525 or the memory module 530 to perform the function. Furthermore, the processor 510 may display the instructional and operational information on the display 515 for the user' reference and convenience.

The processor 510 issues instructional information to the RF module 535, to initiate communication, for example, transmits radio signals comprising voice communication data. The RF module 535 comprises a receiver and a transmitter to receive and transmit radio signals. An antenna 540 facilitates the transmission and reception of radio signals. Upon receiving radio signals, the RF module 535 may forward and convert the signals to baseband frequency for processing by the processor 510. The processed signals would be transformed into audible or readable information outputted via the speaker 545, for example. The processor 510 also includes the protocols and functions necessary to perform the various processes described herein.

Depending on implementation, it is possible that the present invention can take the form of an entirely hardware embodiment, an entirely software embodiment or an embodiment containing both hardware and software elements. A software embodiment may include, but not be limited to, to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Other components may be coupled to the system. Input/output or I/O devices (including but not limited to keyboards, displays, pointing devices, etc.) can be coupled to the system either directly or through intervening I/O controllers. Network adapters (e.g., modem, cable modem, Ethernet cards) may also be coupled to the system to enable the data processing system to become coupled to other data processing systems or remote printers or storage devices through intervening private or public networks.

It should be understood that the logic code, programs, modules, processes, methods, and the order in which the respective elements of each method are performed are purely exemplary. Depending on the implementation, they may be performed in any order or in parallel, unless indicated otherwise in the present disclosure. Further, the logic code is not related, or limited to any particular programming language, and may be comprise one or more modules that execute on one or more processors in a distributed, non-distributed, or multiprocessing environment.

The method as described above may be used in the fabrication of integrated circuit chips. The resulting integrated circuit chips can be distributed by the fabricator in raw wafer form (that is, as a single wafer that has multiple unpackaged chips), as a bare die, or in a packaged form. In the latter case, the chip is mounted in a single chip package (such as a plastic carrier, with leads that are affixed to a motherboard or other higher level carrier) or in a multi-chip package (such as a ceramic carrier that has either or both surface interconnections of buried interconnections).

In any case, the chip is then integrated with other chips, discrete circuit elements, and/or other signal processing devices as part of either (a) an intermediate product, such as a motherboard, or (b) and end product. The end product can be any product that includes integrated circuit chips, ranging from toys and other low-end applications to advanced computer products having a display, a keyboard or other input device, and a central processor.

Therefore, it should be understood that the invention can be practiced with modification and alteration within the spirit and scope of the appended claims. The description is not intended to be exhaustive or to limit the invention to the precise form disclosed. These and various other adaptations and combinations of the embodiments disclosed are within the scope of the invention and are further defined by the claims and their full scope of equivalents.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims. Therefore, all changes and modifications that fall within the metes and bounds of the claims, or equivalence of such metes and bounds are intended to be embraced by the appended claims.

The foregoing embodiments and advantages are merely exemplary and are not to be construed as limiting the present invention. The present teaching can be readily applied to other types of apparatuses.

The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

[Industrial Applicability]

The present invention is directed to different methods for allocating and choosing dedicated signatures for random access.

What is claimed is:

1. A method for performing a random access procedure at a mobile terminal in a wireless communication system, the method comprising:
   receiving first information including a root sequence index and a cyclic shift parameter, wherein the root sequence index and the cyclic shift parameter are used to identify available preambles in a cell, the available preambles including contiguous non-dedicated preambles and contiguous dedicated preambles;
   receiving second information about a number of the contiguous non-dedicated preambles among a total number of the available preambles; and
   transmitting a non-dedicated preamble or a dedicated preamble for the random access procedure,
   wherein the transmitted non-dedicated preamble is randomly selected by the mobile terminal from the contiguous non-dedicated preambles, and
   wherein the transmitted dedicated preamble is indicated from the contiguous dedicated preambles by an identifier received from a base station.

2. The method of claim 1, wherein the contiguous non-dedicated preambles and the contiguous dedicated preambles form two contiguous sets of preambles.

3. The method of claim 1, wherein the number of the available preambles is 64, and the second information is 6-bit information.

4. The method of claim 1, wherein the identifier is received from the base station during a handover procedure.

5. The method of claim 1, wherein the available preambles are Zadoff-Chu preambles.

6. A mobile terminal for performing a random access procedure at the mobile terminal in a wireless communication system, the mobile terminal comprising:
   a transmitter configured to transmit information;
   a receiver configured to receive information; and
   a processor configured to:
   receive first information including a root sequence index and a cyclic shift parameter, wherein the root sequence index and the cyclic shift parameter are used to identify available preambles in a cell, the available preambles including contiguous non-dedicated preambles and contiguous dedicated preambles;
   receive second information about a number of the contiguous non-dedicated preambles among a total number of the available preambles; and transmit a non-dedicated preamble or a dedicated preamble for the random access procedure, wherein the transmitted non-dedicated preamble is randomly selected by the mobile terminal from the contiguous non-dedicated preambles and wherein the transmitted dedicated preamble is indicated from the contiguous dedicated preambles by an identifier received from a base station.

7. The mobile terminal of claim 6, wherein the contiguous non- dedicated preambles and the contiguous dedicated preambles form two contiguous sets of preambles.

8. The mobile terminal of claim 6, wherein the number of the available preambles is 64, and the second information is 6-bit information.

9. The mobile terminal of claim 6, wherein the identifier is received from the base station during a handover procedure.

10. The mobile terminal of claim 7, wherein the available preambles are Zadoff-Chu preambles.

* * * * *